US009740600B2

(12) United States Patent
Vorganti

(10) Patent No.: US 9,740,600 B2
(45) Date of Patent: Aug. 22, 2017

(54) METHOD AND DEVICE FOR IMPROVING SOFTWARE PERFORMANCE TESTING

(71) Applicant: Surya Vorganti, Chennai (IN)

(72) Inventor: Surya Vorganti, Chennai (IN)

(73) Assignee: WIPRO LIMITED, Bangalore (IN)

( * ) Notice: Subject to any disclaimer, the term of this patent is extended or adjusted under 35 U.S.C. 154(b) by 49 days.

(21) Appl. No.: 14/668,355

(22) Filed: Mar. 25, 2015

(65) Prior Publication Data

US 2016/0232085 A1    Aug. 11, 2016

(30) Foreign Application Priority Data

Feb. 10, 2015   (IN) .............................. 656/CHE/2015

(51) Int. Cl.
*G06F 11/36*   (2006.01)
*G06F 11/34*   (2006.01)

(52) U.S. Cl.
CPC ...... *G06F 11/3692* (2013.01); *G06F 11/3684* (2013.01); *G06F 11/3688* (2013.01); *G06F 11/3476* (2013.01)

(58) Field of Classification Search
CPC ............. G06F 11/3688; G06F 11/3684; G06F 11/3664; G06F 11/3672
See application file for complete search history.

(56) References Cited

U.S. PATENT DOCUMENTS

| 6,201,815 B1* | 3/2001 | Nomura ............... H04N 21/434 348/E5.005 |
| 7,373,552 B2 | 5/2008 | Björsne |
| 2008/0092123 A1* | 4/2008 | Davison .............. G06F 11/3476 717/128 |
| 2008/0263195 A1 | 10/2008 | Kroll et al. |
| 2008/0273804 A1* | 11/2008 | Malewski .............. H04N 1/644 382/233 |
| 2010/0077480 A1* | 3/2010 | Yoo ....................... G06Q 10/107 726/24 |
| 2011/0296383 A1* | 12/2011 | Pasternak ........... G06F 11/3688 717/124 |

* cited by examiner

*Primary Examiner* — Jigar Patel
(74) *Attorney, Agent, or Firm* — Finnegan, Henderson, Farabow, Garrett & Dunner LLP

(57) ABSTRACT

Embodiments of the present disclosure disclose a method and a device for improving software performance testing. The method comprises receiving input data from one or more test management systems. The method further comprises identifying at least one behavior model based on the input data. The method further comprises correlating the at least one behavior model with at least one of affected parameters to determine one or more performance issues in the input data. The method further comprises verifying the one or more performance issues by reassessing the at least one behavior model.

18 Claims, 6 Drawing Sheets

METHOD AND DEVICE FOR IMPROVING SOFTWARE PERFORMANCE TESTING

PRIORITY CLAIM

This U.S. patent application claims priority under 35 U.S.C. §119 to: India Application No. 656/CHE/2015, filed Feb. 10, 2015. The entire content of the aforementioned application is incorporated herein by reference.

TECHNICAL FIELD

The present subject matter is related, in general to performance testing and more particularly, but not exclusively to a method and a device for improving software performance testing.

BACKGROUND

In general, performance engineering includes a set of activities across the application development life cycle to ensure that the application/software meet the predefined performance requirements, in the production environment. Performance testing is a part of performance engineering, which involves validation of parameters such as system responsiveness, stability under workload, scalability, reliability, resilience and resource usage.

Currently, during performance testing, every system software and application software module monitors and retrieves the log files or logs in different formats. The different log files contain information in various formats making it difficult to analyze, that is to determine which information is useful and which is irrelevant. Also, it has become difficult to perform root-cause analysis accurately from the log files in case of occurrence of errors and this has become an issue. This issue has a high impact on the systems and/or software applications during performance testing as they need to run multiple performance tests to find the bottlenecks in the system and/or application. The issues may considerably increase cost on resources, investment on hardware and application module.

The systems currently available for performance test root-cause analysis are not able to identify the symptoms and behavior models of the different error events from the log files accurately. Therefore, it takes more time to identify the issue or bottleneck in the software application and improving the performance.

A system performance depends on multiple factors and when it is low, root-cause analysis must be performed systematically to make the system performance more effective. There may be more than one root-cause for an event or a problem, and it is difficult to determine the issues for demonstrating the persistence and sustaining the effort required. Also, it is difficult to make decision why the performance is low, where it went wrong, and which teams such as development, testing and infrastructure, is responsible.

At present, the issues mainly faced while improving the system performance by testing are to identify the performance bottlenecks, root-cause for the bottleneck and the team responsible for the issue.

SUMMARY

Disclosed herein is a method and device for improving software performance testing. The method comprises receiving and analyzing the input data from different test management systems. Then, the performance issues or root causes in the performance testing are identified and verified.

In an aspect of the present disclosure, a method for improving software performance testing is provided. The method comprises receiving input data from one or more test management systems. Then, the method comprises identifying at least one behavior model based on the input data. Further, the method comprises correlating the at least one behavior model with at least one of affected parameters to determine one or more performance issues in the input data and verifying the one or more performance issues by reassessing the at least one behavior model.

In an embodiment of the present disclosure, a performance test computing device for improving software performance testing is provided. The performance test computing device comprises a processor and a memory communicatively coupled to the processor. The memory stores processor-executable instructions, which, on execution, cause the processor to receive input data from one or more test management systems, identify at least one behavior model based on the input data, correlate the at least one behavior model with at least one of affected parameters to determine one or more performance issues in the input data and verify the one or more performance issues by reassessing the at least one behavior model.

In another aspect of the present disclosure, a non-transitory computer readable medium is disclosed. The non-transitory computer readable medium includes instructions stored thereon that when processed by a processor causes a device to perform operations comprising receiving input data from one or more test management systems. The operations further comprise identifying at least one behavior model based on the input data. The operations further comprise correlating the at least one behavior model with at least one of affected parameters to determine one or more performance issues in the input data and verifying the one or more performance issues by reassessing the at least one behavior model.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of device or system and/or methods in accordance with embodiments of the present subject matter are now described, by way of example only, and with reference to the accompanying figures, in which.

DETAILED DESCRIPTION

Figure 1:
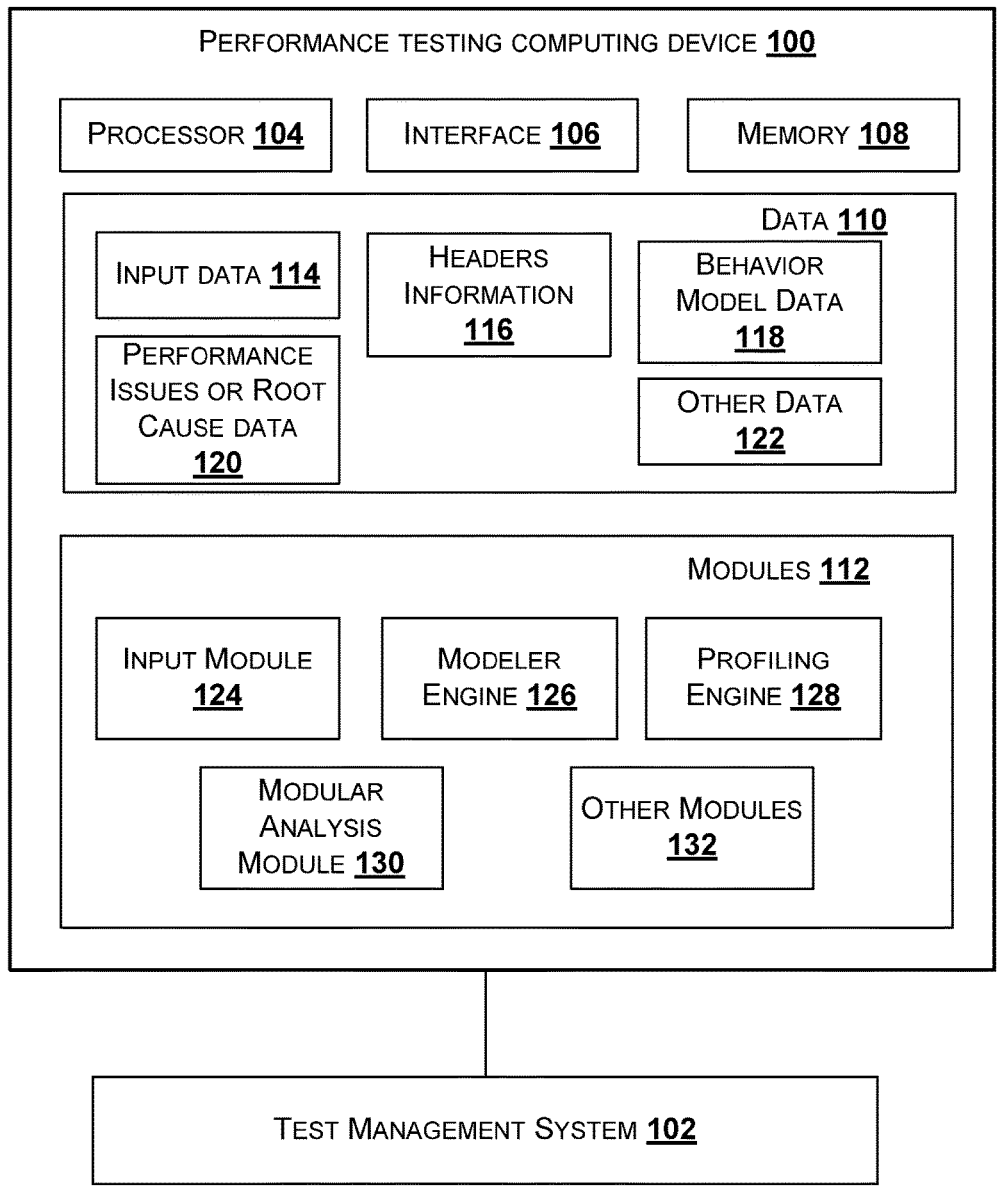
FIG. 1 illustrates a block diagram of an exemplary performance test computing device for improving software performance testing in accordance with some embodiments of the present disclosure.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a device or system or apparatus proceeded by "comprises . . . a" does not, without more constraints, preclude the existence of other elements or additional elements in the device or system or apparatus.

Embodiments of the present disclosure are related to a method and a computing device for improving software performance testing. The device receives input data, for example log files from test management systems and analyzes the same for detecting the performance issues. Further, the device improves the software performance and provides a detailed view of all the issue.

The term customer refers to any person who is heading an entity, such as a company, organization, institution, or an association.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates a block diagram of an exemplary performance testing computing device or performance testing device 100 for improving software performance testing in accordance with some embodiments of the present disclosure. The performance testing computing device 100 is communicatively connected to a test management system 102. Examples of the test management system 102 may include, but not limited to, web server, application server, database server, performance testing module, and testing modules. It may be understood by a person skilled in the art that any other third party test management system can be used with method of the present disclosure.

The performance testing computing device 100 may include at least one central processing unit ("CPU" or "processor") 104 and a memory 108 storing instructions executable by the at least one processor 104. The processor 104 may comprise at least one data processor for executing program components for executing user- or system-generated requests. A user may include a person, a person using a device such as those included in this disclosure, or such a device itself. The memory 108 is communicatively coupled to the processor 104. In an embodiment, the memory 108 stores one or more performance issues or root cause data for improving performance testing. The performance testing device 100 further comprises an I/O interface 106. The I/O interface 106 is coupled with the processor 104 through which the input is received.

In an embodiment, one or more data 110 may be stored within the memory 108. The one or more data 110 may include, for example, input data 114, header information 116, behavior model data 118, performance issues or root cause data 120, and other data 122.

In an embodiment, the input data 114 comprises input from the test management system 102. The input data may be, for example, log files from at least one or more test management system like database servers, web servers, application server, performance testing module and any application testing module.

The headers information 116 is generated using the input data 114. In an embodiment, the headers information is generated by scanning the input data 114 into a predefined system friendly format which can be easily processed by the device 100. Thereafter, a comparison module implemented in the device 100 compares the one or more headers to identify one or more crucial violations also referred as behavior violations during performance testing.

The behavior model data 118 is determined based on the header information 116, which is obtained from the input data 114. The input data maybe log files related to one of a web server, database server, application server, client server, performance module, testing modules and the like. The behavior model data 118 provides the information that the log files are related to one of memory, process, hardware and virtual behavior.

The performance issues or root cause data 120 is the information of occurrence of errors while performing root-cause analysis based on the log files. The performance issues have a high impact during performance testing which determine the bottlenecks of an application. The performance issues may increase cost on resources, investment on hardware and application module.

In an embodiment, the data 110 in the memory 108 is processed by the modules 112 of the processor 104. The modules 112 may be stored within the memory 108. Also, the modules can be implemented in any suitable hardware, software, firmware, or combination thereof.

In one implementation, the modules may include, for example, an input module 124, a modeler engine 126, a profiling engine 128, and a modular analysis engine 130. The performance testing device 100 may also comprise other modules 132 to perform various miscellaneous functionalities of the device 100. It will be appreciated that such aforementioned modules may be represented as a single module or a combination of different modules.

In an embodiment, the input module 124 receives input data 114 from the test management system 102. The input data 124 received by the input module 124 is a plurality of log files, referred as logs, from the test management system 102. The input data 124 is also performance information from plurality of testing modules. The input module 124 provides the input data 114 available to the modeler engine 126 for identifying at least one behavior model based on the input data 114. All the test management systems 102 that are to be used for improving the performance test are plugged into the input module 124. The test management system 102 which may be connected to the input module 124 are servers such as, but not limited to web server, database server, application server and client server, performance module and testing modules. In one embodiment, the input module 124 receives input data 114 from plurality of test management system 102 using handshaking. It may be understood that at least one or a combination of multiple systems can be used with the present disclosure.

Figure 2:
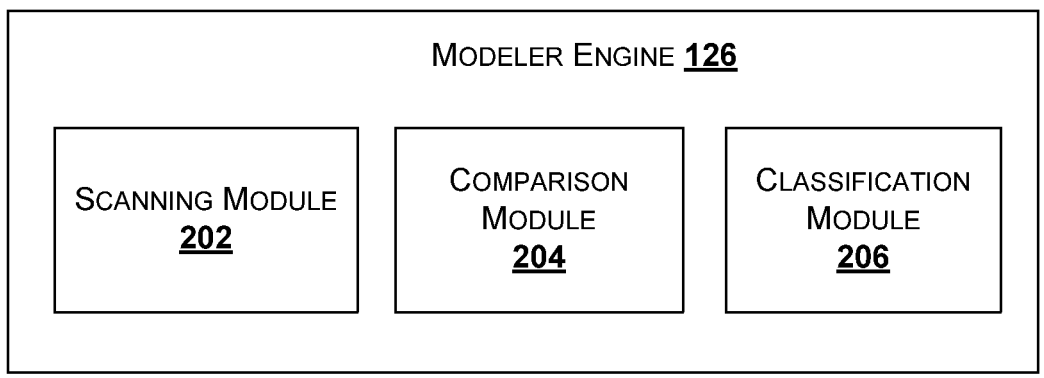
FIG. 2 illustrates an exemplary block diagram of a modeler engine in accordance with some embodiments of the present disclosure.

The modeler engine 126 receives input data 114 from the input module 124 and classifies the input data 114 in to a predefined format for further processing by the profiling engine 128. The input data 114 is designed according to a server and might have different format and structure. The modeler engine 126 classifies the input data 114 into type and behavior based on header of the input data 114. For example, the log files related to a database server has different header compared to the log files of an application server. Thus, the modeler engine 126 based on the header of an input i.e. log file classifies it accordingly. In one embodiment, the classification is performed based on the behavior of the log file into one of memory, process, hardware and virtual behavior. The classified input is sent to the profiling engine 128. The sub modules of the modeler engine 126 are illustrated in FIG. 2. The sub modules of the modeler engine 126 comprise a scanning module 202, a comparison module 204 and a classification module 206.

The scanning module 202 receives the plurality of log files from the input module 124 to scan relative logs. The scanning is performed by obtaining one or more headers from the plurality of log files. Thereafter, the comparison module 204 compares the one or more headers to identify one or more crucial violations also referred as behavior violations happened at the time of performance testing. The classification module 206 classifies the one or more headers in to at least one behavior model based on predefined patterns. In an example, the predefined patterns may operate with specific header quotes. In a test, if the classification module 206 identifies that 500 internal server errors were high as well as the page response is good, then based on the predefined patterns it may be identified whether the 500 internal server errors are coming from a webserver or from page logic. The at least one behavior model is one of memory, process, hardware and virtual. The at least one behavioral model is converted into binary message or data and sent to profiling engine 128. For example, the input data 114 provided by the test management system has an issue of internal server error such as 500, then the modeler engine 126 compares the number of errors reported by a performance tool and total errors recorded in an 113 server. The scanning module 202 performs scanning of the plurality of log files to obtain one or more headers. The comparison module 204 compares the one or more headers to identify and compare with the predefine parameters such as, but not limited to, webserver, test data, server behavior, system health, hardware stats to identify one or more crucial violations. Thereafter, the classification module 206 compares with the predefine patterns using pattern recognition to identify the layer behavior and identify whether the issues is one of test data and configuration data. In an embodiment, the at least one behavioral model is converted into binary data and sent to profiling engine 128 for further processing.

Figure 3:
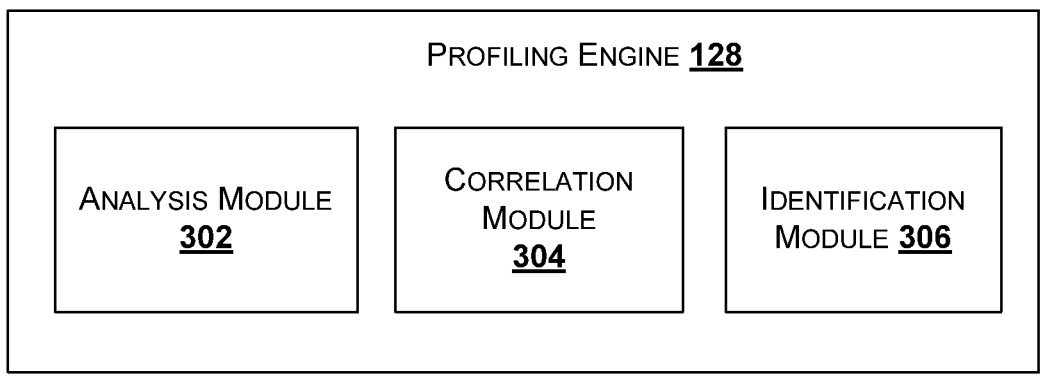
FIG. 3 illustrates an exemplary block diagram of a profiling engine in accordance with some embodiments of the present disclosure.

The profiling engine 128, also referred as engineering framework for advanced monitoring and profiling (EFAMP) or determiner module 128 receives binary data, associated with the at least one behavior model, from the modeler engine 126 and determines one or more performance issues or also referred as issue or root cause in the performance testing. The profiling engine 128 analyzes the binary data using a predefined decision algorithm to generate one or more patterns. Thereafter, the predefined decision algorithm correlates the one or more patterns with predefined patterns such as affecting parameters to determine the corresponding performance issues or root cause in the input data. In an example, the decision algorithm may verify the logs and decide if there is any bottleneck inside the logs which are under test at that time. Further, the decision algorithm may compare the page response time and then pull the decision whether it is a memory leak or not. In case, there were continuous page faults happening in the test and available memory is very less, then the decision algorithm may parse the web page. The sub modules of the profiling engine 128 are illustrated in FIG. 3. The sub modules of the profiling engine 128 comprise an analysis module 302, a correlation module 304 and an identification module 306.

The analysis module 302 analyzes the binary data, associated with the at least one behavior model, based on the system behavior for the performance test, in an exemplary embodiment of the present disclosure. The analysis module 302 also analyzes the available resources for the binary data at time of performance testing, in another embodiment of the present disclosure. For example, when a system performance is low then there may be one or more root causes. The analysis is performed systematically and the different various affecting parameters causing issues are correlated optimally using the correlation module 304 to identify all the root causes. The correlation module 304 correlates the one or more patterns with the one or more affected parameters to identify one or more performance issues, wherein the affected parameters is one of network latency, memory issues and slow page responses. The identification module 306 identifies the performance issues based on correlated data of the correlation module 304 and the one or more headers information, in one embodiment. The identification module 306 provides the impacted areas in the performance testing device because of the performance issues and provides an output in a binary format. The output binary format provided by the identification module 306 is in encrypted format to determine one or more performance issues, the reason for the existence of the one or more performance issues, and provide a solution to reduce or prevent the likelihood that the performance issues. The one or more performance issues or different root causes identified are forwarded to the modular analysis engine 130 for further analysis and optimization.

Figure 4:
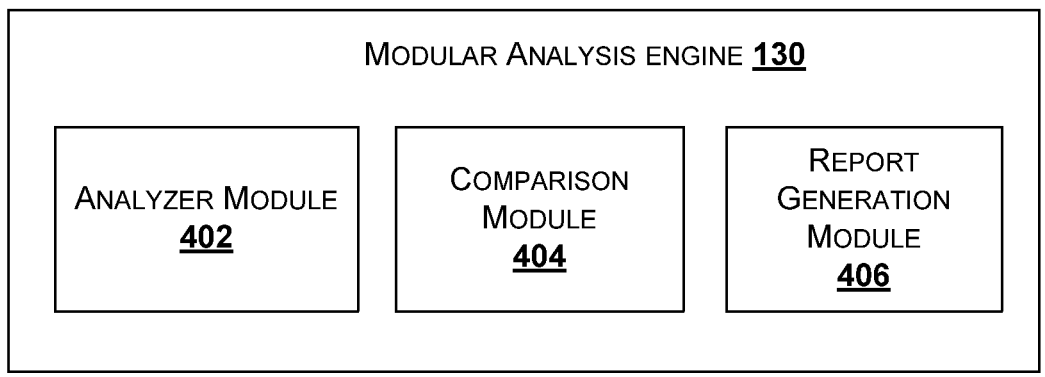
FIG. 4 illustrates an exemplary block diagram of a modular analysis engine in accordance with some embodiments of the present disclosure.

Referring back to FIG. 1, the modular analysis engine also referred as modular analysis bottle (MAB) module 130 is responsible for determining the precise root cause for performance issues and rendering resolution recommendations. The MAB module 130 reconfirms the one or more performance issues identified by the profiling engine 128 and provide a solution to prevent the performance issues. The MAB module 130 receives the identified performance issues or root-causes from the profiling engine 128 analyzes the data to reassess and reconfirmation the performance issues. The MAB module 130 identifies the most precise root cause and determines the preventive solutions to prevent the performance issues. The MAB module 130 analyzes the at least one behavioral model data and behavior violations. The behavioral violations identified by the modeler engine 126 and the system exhibited behavior under the load are used to determine the most accurate root-cause and thus, the bottleneck for the system. The sub modules of the modular analysis engine 130 are illustrated in FIG. 4. The sub modules of the modular analysis engine 130 comprise an analyzer module 402, a comparison module 404 and a report generation module 406.

The analyzer module 402 reassesses the performance issues or root-causes identified made by profiling engine 128, by reconstruction of headers in a predetermined way. The analyzer module 402 performs a pattern match to identify the root cause for the bottleneck more accurately. For example, if the result regarding the root cause is a negative result, then the required correction is performed by the analyzer module 402 to provide a root-cause which is more accurate. The MAB engine 130 uses the previous or past data of the system under test by tracing the logs. The MAB engine 130 takes the sequential values of logs and using the comparison module 404 compares the systems behavior at predefined instance with the one or more behavioral model data. For example, let the memory of the system be utilized highly, garbage collection is not being performed and allocation cycle of the memory shows all objects are getting allocated. However, the testing module shows the root cause analysis that there is a possible leakage inside. Based on the root-causes identified one or more resolutions or solutions are determined using predefined modeled approach. The solutions perform a comparison of behavior and system health to validate the marking numbers in operating system or in a web server the changes required and accordingly classify the patterns. Thereby, fixing the root causes and improving the device performance. The report generator module 406 generates various predefined plots or graphs as an output based on the output of the MAB engine 130. The graphs provide information on one or more performance issue or different root causes. The graphs also comprise performance issues which are making the performance of the device low and the possible resolution recommendations. Further, the graphs generated by the report generation module 406 show the performance issues not limiting to web server, application server, database server.

Figure 5:
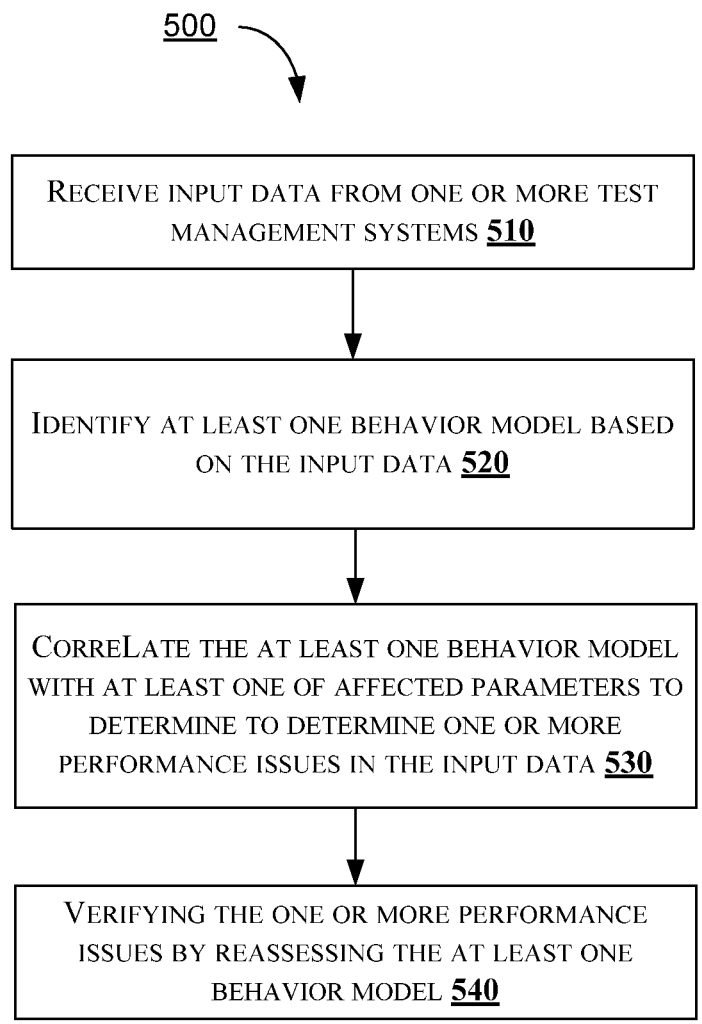
FIG. 5 shows a flowchart illustrating a method for improving software performance testing in accordance with some embodiments of the present disclosure.

FIG. 5 shows a flowchart illustrating a method for improving software performance testing in accordance with some embodiments of the present disclosure.

As illustrated in FIG. 5, the method 500 comprises one or more blocks for improving software performance testing 100. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 510, receive the input data 114 from the test management system 102. In an embodiment, the input module 124 receives the input data 114 from the test management system 102. The input module 124 identifies the received data from at least one or more test management system like database servers, web servers, application server, performance testing module and any application testing module.

At block 520, identify at least one behavior model based on the input data 114. The modeler engine 126 identifies the at least one behavior model by obtaining one or more headers from the plurality of log files. Next, the modeler engine 126 compares the plurality of log files to obtain obtaining one or more system violations. Thereafter, the modeler engine 126 classifies the one or more headers in to at least one behavior model using predefined patterns.

At block 530, correlate the at least one behavior model with at least one of affected parameters to determine one or more performance issues in the input data. The correlation is performed by the profiling engine 128 by generating one or more patterns for the at least one behavior model received from the modeler engine 126. Thereafter, the profiling engine 128 performs correlation of the one or more patterns with one or more affecting parameters to identify one or more performance issues.

At block 540, verify the one or more performance issues by reassessing the at least one behavior model. The modular analysis engine 130 performs generation of one or more headers based on a predefined technique and compares the one or more headers using one or more predefined patterns to reassess the at least one behavior model. Thereby, cross verifying the performance issues and the root causes for a device. Based on the root causes the modular analysis engine 130 provides one or more resolutions or solutions for improving software performance testing and performance of the device.

Thus, the method and the device improve software performance by analyzing the root causes and finding bottlenecks which are causing performance issues like high page response time, memory leaks, frequent disconnects with webserver, and long running queries.

Computer System

Figure 6:
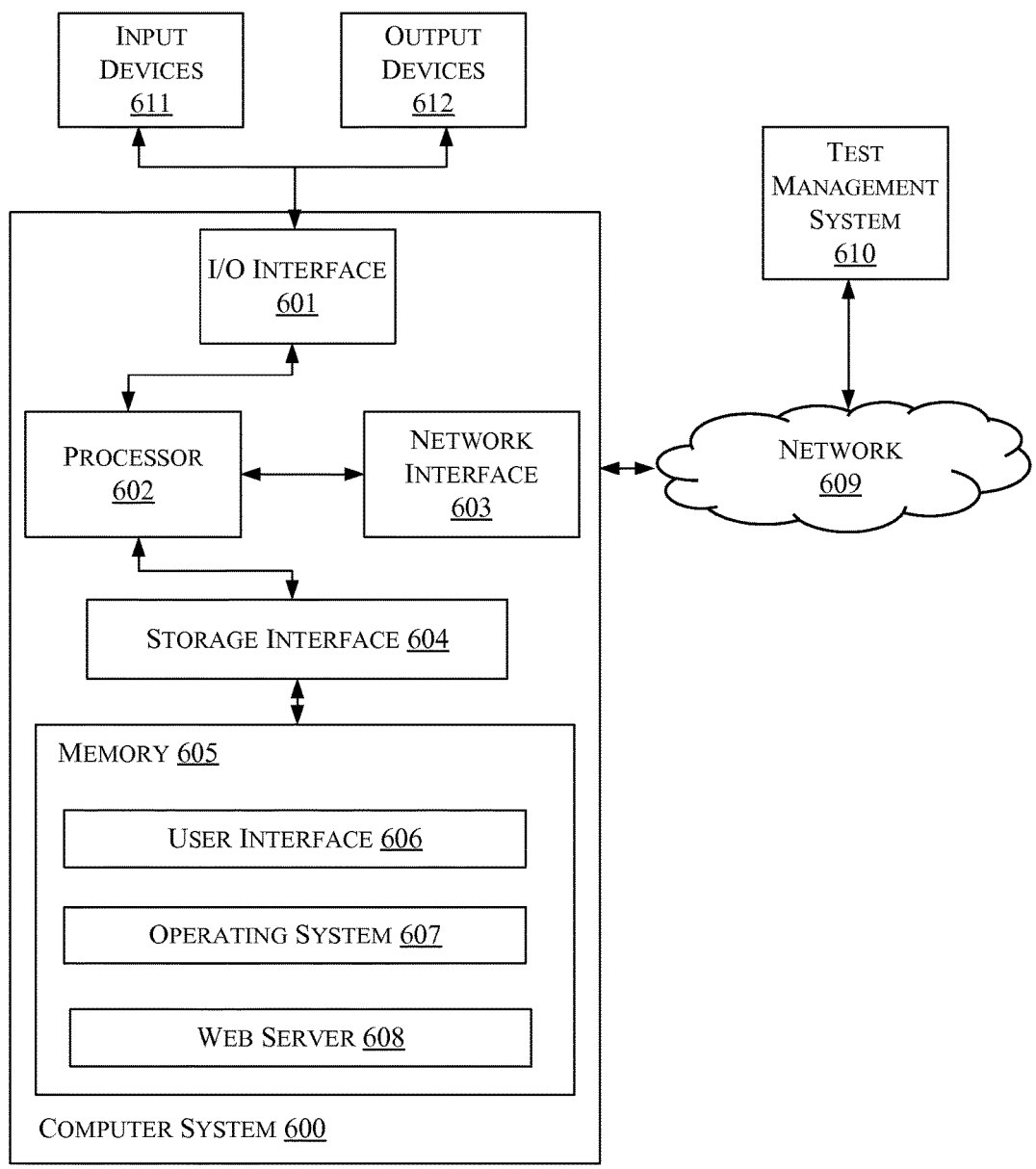
FIG. 6 illustrates a block diagram of an exemplary computer system for implementing embodiments consistent with the present disclosure.

FIG. 6 illustrates a block diagram of an exemplary computer system 600 for implementing embodiments consistent with the present disclosure. In an embodiment, the computer system 600 is used to implement the performance testing computing device 100. The computer system 600 determines performance issues in performance testing and improves software performance testing. The computer system 600 may comprise a central processing unit ("CPU" or "processor") 602. The processor 602 may comprise at least one data processor for executing program components for executing user- or system-generated business processes. A user may include a person, a person using a device such as such as those included in this disclosure, or such a device itself. The processor 602 may include specialized processing units such as integrated system (bus) controllers, memory management control units, floating point units, graphics processing units, digital signal processing units, etc.

The processor 602 may be disposed in communication with one or more input/output (I/O) devices (611 and 612) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the computer system 600 may communicate with one or more I/O devices (611 and 612). For example, the input device 611 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 612 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the processor 602 may be disposed in communication with a communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the computer system 600 may communicate with test management system 610.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, user interface application 606, an operating system 607, web server 608 etc. In some embodiments, computer system 600 may store user/application data 606, such as the data, variables, records, etc. as described in this disclosure. Such databases may be implemented as fault-tolerant, relational, scalable, secure databases such as Oracle or Sybase.

The operating system 607 may facilitate resource management and operation of the computer system 600. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 600, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 600 may implement a web browser 608 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 600 may implement a mail server stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 600 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, nonvolatile memory, hard drives, CD ROMs, DVDs, flash drives, disks, and any other known physical storage media.

Advantages of the embodiment of the present disclosure are illustrated herein.

In an embodiment, the present disclosure provides after performance testing decision making, which will be easy to a customer.

In an embodiment, the present disclosure provides nearest root cause which will help development/test/infra to reduce the cycle time to fix the issues In an embodiment of the present disclosure, performance test cycle will be reduced.

In an embodiment of the present disclosure, GO-live deadlines will never miss.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral Numerals: | |
|---|---|
| Reference Number | Description |
| 100 | performance testing computing device |
| 102 | Test management system |
| 104 | Processor |
| 106 | Interface |
| 108 | Memory |
| 110 | Data |
| 112 | Modules |
| 114 | Input Data |
| 116 | Header Information |
| 118 | Behavior Model Data |
| 120 | Issues or root cause |
| 122 | Other Data |
| 124 | Input Module |
| 126 | Modeler engine |
| 128 | Profiling Engine |
| 130 | Modular Analysis Module |
| 132 | Others Module |
| 202 | Scanning Module |
| 204 | Comparison Module |
| 206 | Classification Module |
| 302 | Analysis Module |
| 304 | Correlation Module |
| 306 | Identification Module |
| 402 | Analyzer Module |
| 404 | Comparison Module |
| 406 | Report Generation Module |
| 600 | Computer System |
| 601 | I/O Interface |
| 602 | Processor |
| 603 | Network Interface |
| 604 | Storage Interface |
| 605 | Memory |
| 606 | User Interface Application |
| 607 | Operating System |
| 608 | Web Browser |
| 610 | Test Management System |

-continued

Referral Numerals:

| Reference Number | Description |
|---|---|
| 611 | Input Device |
| 612 | Output Device |

What is claimed is:

1. A method for improving software performance testing, comprising:

receiving, by a performance test computing device, input data from one or more test management systems, wherein the input data comprises a plurality of log files from the one or more test management systems;

extracting, by the performance test computing device, one or more headers from the plurality of log files;

identifying, by the performance test computing device, one or more behavior violations by comparing the one or more headers obtained from the one or more test management systems with one or more predefine parameters;

classifying, by the performance test computing device, the one or more headers into at least one behavior model based on one or more predefined patterns;

correlating, by the performance test computing device, the at least one behavior model with at least one of one or more affected parameters to determine one or more performance issues in the input data, the one or more affected parameters comprising one or more of memory leaks, code instability, or page response time; and verifying, by the performance test computing device, the one or more performance issues by reassessing the at least one behavior model and the one or more behavior violations.

2. The method as claimed in claim 1, wherein the plurality of log files are selected from at least one of operating system logs, web server logs, application server logs, or database server lops.

3. The method as claimed in claim 1, wherein correlating the at least one behavior model comprises:

generating one or more patterns for the at least one behavior model; and correlating the one or more patterns with the one or more affected parameters to identify the one or more performance issues.

4. The method as claimed in claim 3, further comprising determining at least one of system behavior for the software performance testing and predefined resources available at the time of the software performance testing to identify the one or more performance issues.

5. The method as claimed in claim 1, wherein verifying the one or more performance issues by reassessing the at least one behavior model comprises:

generating one or more headers based on a modular technique; and comparing the one or more headers using the one or more predefined patterns to reassess the at least one behavior model.

6. The method as claimed in claim 1, further comprising generating one or more reports comprising the one or more performance issues identified by the performance test computing device.

7. A performance test computing device for improving software performance testing, comprising:

a processor; and a memory communicatively coupled to the processor, wherein the memory stores processor-executable instructions, which, on execution, causes the processor to:

receive input data from one or more test management systems, wherein the input data comprises a plurality of log files from the one or more test management systems;

extract one or more headers from the plurality of log files;

identify one or more behavior violations by comparing the one or more headers obtained from the one or more test management systems with one or more predefined parameters;

classify the one or more headers in to at least one behavior model based on one or more predefined patterns;

correlate the at least one behavior model with at least one of one or more affected parameters to determine one or more performance issues in the input data, the one or more affected parameters comprising one or more of memory leaks, code instability, or page response time; and verify the one or more performance issues by reassessing the at least one behavior model and the one or more behavior violations.

8. The performance test computing device as claimed in claim 7, wherein the plurality of log files are selected from at least one of operating system logs, web server logs, application server logs, or database server logs.

9. The performance test computing device as claimed in claim 7, wherein correlating the at least one behavior model comprises:

generating one or more patterns for the at least one behavior model; and correlating the one or more patterns with the one or more affected parameters to identify the one or more performance issues.

10. The performance test computing device as claimed in claim 9, further comprising determining at least one of system behavior for the software performance testing and predefined resources available at the time of the software performance testing to identify the one or more performance issues.

11. The performance test computing device as claimed in claim 7, wherein verifying the one or more issues by reassessing the at least one behavior model comprises:

generating one or more headers based on a modular technique; and comparing the one or more headers using the one or more predefined patterns to reassess the at least one behavior model.

12. The performance test computing device as claimed in claim 7, further comprising generating one or more reports comprising the one or more performance issues identified by the performance test computing device.

13. A non-transitory computer readable medium including instructions stored thereon that when processed by at least one processor cause a system to perform operations comprising:

receiving input data from one or more test management systems, wherein the input data comprises a plurality of log files from the one or more test management systems;

extracting one or more headers from the plurality of log files;

identifying one or more behavior violations by comparing the one or more headers obtained from the one or more test management systems with one or more predefine parameters;

classifying the one or more headers in to at least one behavior model based on one or more predefined patterns;

correlating the at least one behavior model with at least one of one or more affected parameters to determine one or more performance issues in the input data, the one or more affected parameters comprising one or more of memory leaks, code instability, or page response time; and verifying the one or more performance issues by reassessing the at least one behavior model and the one or more behavior violations.

14. The medium as claimed in claim 13, wherein the plurality of log files are selected from at least one of operating system logs, web server logs, application server logs, or database server logs.

15. The medium as claimed in claim 13, wherein the instructions further cause the at least one processor to perform operations comprising:

generating one or more patterns for the at least one behavior model; and correlating the one or more patterns with the one or more affected parameters to identify the one or more performance issues.

16. The medium as claimed in claim 15, wherein the instructions further cause the at least one processor to perform operations comprising:

determining at least one of system behavior for the software performance testing and predefined resources available at the time of the software performance testing to identify the one or more performance issues.

17. The medium as claimed in claim 13, wherein the instructions further cause the at least one processor to perform operations comprising:

generating one or more headers based on a modular technique; and comparing the one or more headers using the one or more predefined patterns to reassess the at least one behavior model.

18. The medium as claimed in claim 13, wherein the instructions further cause the at least one processor to perform operations comprising:

generating one or more reports comprising the one or more performance issues identified by the performance test computing device.

* * * * *